UNITED STATES PATENT OFFICE.

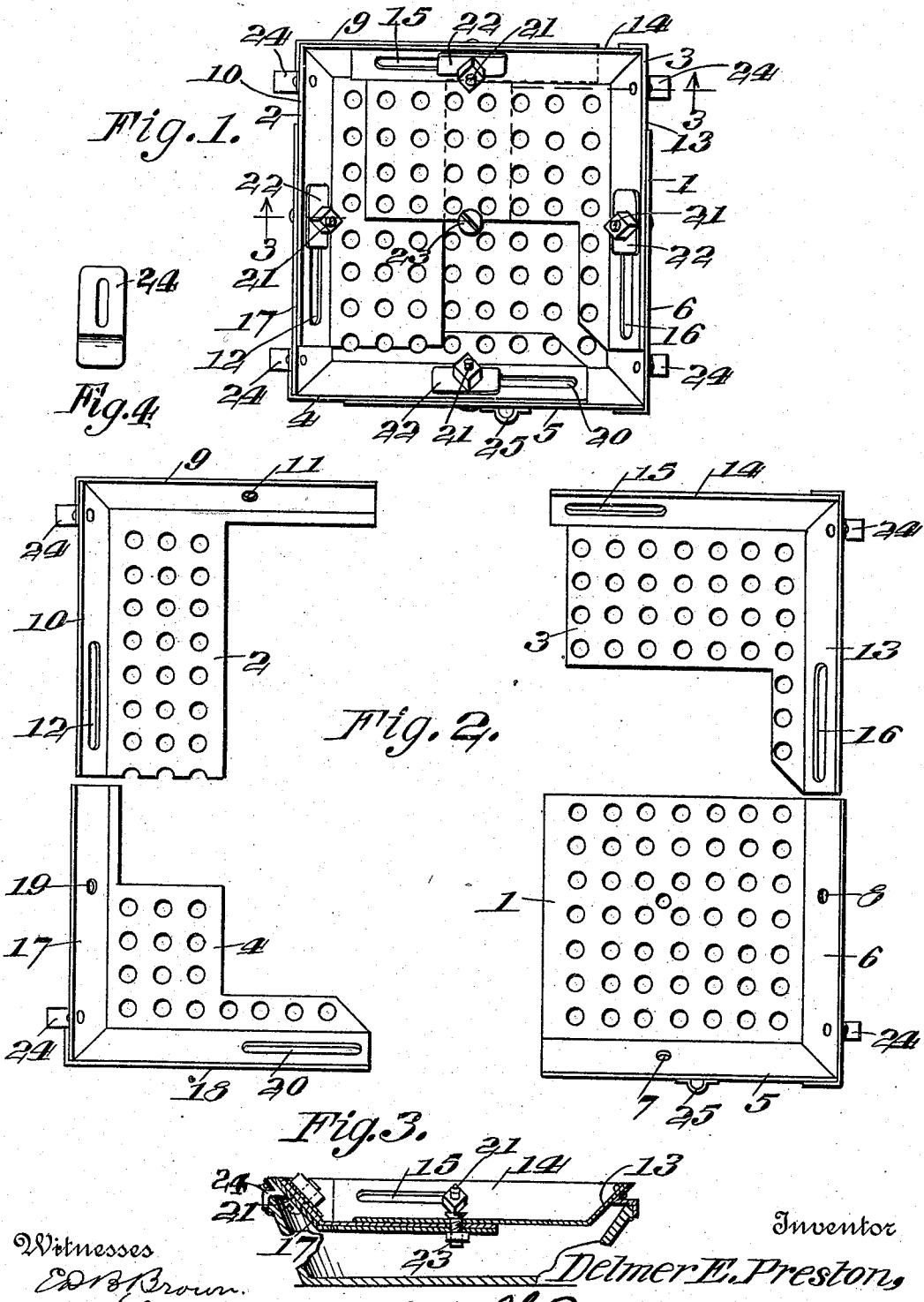

DELMER ELBA PRESTON, OF CHICAGO, ILLINOIS.

ASH-SIEVE.

936,737. Specification of Letters Patent. Patented Oct. 12, 1909.

Application filed September 8, 1908. Serial No. 452,035.

*To all whom it may concern:*

Be it known that I, DELMER ELBA PRESTON, a citizen of the United States, residing at Chicago, in the county of Cook and State of Illinois, have invented certain new and useful Improvements in Ash-Sieves; and I do declare the following to be a full, clear, and exact description of the invention, such as will enable others skilled in the art to which it appertains to make and use the same.

This invention relates to improvements in ash sieves, and contemplates the production of a sieve adapted to be mounted on an ash pan contained within a stove in such manner that the sieve will receive ashes from the grate of the stove and when full may be moved back and forth on the pan.

One of the objects of the invention is the production of a sieve capable of being mounted on an ash pan and adapted to sift the ashes falling from a coal grate without removing the pan from the stove.

Another object of the invention is the production of an adjustable sieve adapted to be positioned on a pan and arranged to sift ashes on said pan without removing the same from a stove.

With these and other objects in view, the invention consists of certain novel features of construction, combination and arrangement of parts as will be more fully described and particularly pointed out in the appended claims, and in the drawings, in which, Figure 1 is a plan view of my improved ash sieve; Fig. 2 is a plan view of the four members comprising the ash sieve arranged in juxtaposition ready for assembling; Fig. 3 is a side elevation, partly in section, of my improved ash sieve positioned on an ash pan, and Fig. 4 is a detail perspective view of an adjustable leg.

In the drawings I have illustrated the preferred embodiment of my invention, which comprises a plurality of slidable sections, 1, 2, 3 and 4.

The section 1 is formed with a perforated body, and edge flanges, 5 and 6, extending at an oblique angle from the body portion so as to form a continuous rim therefor. The flange 5 is formed with an aperture 7 through which a screw bolt is arranged to extend; and the flange 6 is formed with a similar aperture, 8, through which another screw bolt is arranged to extend.

The section 2 is formed with a perforated body and with flanges 9 and 10, which extend at an oblique angle therefrom so as to form a continuous rim for the body portion. The flange 9 is formed with an aperture 11 through which a screw bolt is arranged to extend; and the flange 10 is formed with a longitudinal slot, 12, which is adapted to register with the aperture 19 in section 4.

The section 3 is formed with a perforated body portion and formed with flanges, 13 and 14, extending at an oblique angle therefrom so as to form a continuous rim for the body portion. The flanges 13 and 14 are formed with longitudinal slots, 15 and 16, through which screw bolts are arranged to extend.

The section 4 is formed with a perforated body portion and flanges 17 and 18 extending at an oblique angle therefrom so as to form a continuous rim for the body portion; and the flange 17 is formed with an aperture 19 through which a screw bolt is arranged to extend; and the flange 18 is formed with a longitudinal slot, 20, arranged to register with the aperture 7 in the section 1.

The various sections of my improved ash sieve are arranged to be connected together by screw bolts, 21, which are provided with rectangular washers, 22.

When assembled, the section 4 is positioned on section 1 so that the slot 20 of flange 18 will register with the aperture 7 of the flange 5 of the section 1, and the screw bolt extending through said aperture in said slot serves to adjustably connect the two sections together.

The section 2 is positioned on the section 4, and section 1 with the flange 10 contacting with the flange 17, and the longitudinal slot 12 registering with the aperture 19, and these two sections adjustably connected together by a screw bolt extending through flanges 10 and 17.

The section 3 is mounted on the section 2 and on section 1 so that the flange 13 will contact with the flange 6 of the section 1 and flange 14 will contact with the flange 9 of section 2, and the slot 15 will register with the aperture 11, and the slot 16 will register with the aperture 8. The two sections are connected together by screw bolts which extend through flanges 6, 13 and 14 and 9.

When assembled the various sections are arranged to be moved toward each other or be extended apart so as to occupy a larger or smaller space, and the various sections are held in the different positions in which they may be adjusted by means of the screw bolts, 21.

A stop pin 23 is mounted on the section 1 and serves to limit the movement of the various sections toward each other, and said stop pin may be threaded on the section 1 and screwed against the inner edges of sections 2, 3 and 4, should the same be found expedient.

When assembled the various sections form a pan-shaped device adapted to conveniently receive ashes from a grate.

My improved sieve is mounted on an ash pan by means of legs, 24, which are formed with longitudinal slots and with downwardly bent ends and secured to the flanges of the various sections by means of rivets or screws. The legs 24 are adapted to embrace or rest on the edges of an ash pan in such a manner that the bottom surface of the sieve will depend on the ash pan below said edges and when positioned on a pan the same may be moved back and forth for the purpose of sifting the ashes contained in the sieve without danger of being displaced thereon, said legs effectively preventing side motion of the sieve.

For the purpose of assisting the handling of the sieve, a handle strap, 25, is secured to one of the flanges of the section 1 in such a manner that a poker or other instruemnt may be extended through the strap for the purpose of lifting the sieve off the ash pan and for emptying the contents thereof. The legs 24 may be adjusted on the sieve sections by means of the slot formed therein.

My improved ash sieve may be formed of any material and is practically adjusted to all sizes of ash pans in current use.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. In combination with an ash pan, an ash sieve comprising a plurality of adjustable sections, means for holding the sections in various adjustments, and legs adjustably secured on the sections adapted to be mounted on the ash pan and permit said sections to be moved thereon.

2. An ash sieve comprising a plurality of adjustable sections, means for slidably adjusting the sections, a stop pin secured to one of the sections engaged by the inner edges of the other sections, and a plurality of legs adjustably secured on the sections, said legs being adapted to slidably support the sieve upon an ash pan.

3. An ash sieve comprising a plurality of slidable overlapping sections having oblique flanges formed with longitudinal slots, screw bolts extending through the slots for securing the sections in various adjustments, a stop pin secured to one of the sections and engaged by the other sections, a plurality of legs adjustably secured to the flanges and adapted to engage the edges of an ash pan in such a manner that the bottom of the sieve will be below the edges when said sieve is mounted on said pan, and a handle strap secured to one of the sections for assisting in the removal of the same.

4. In combination with an ash pan, an ash sieve comprising a plurality of adjustably secured overlapping sections, said sections forming a substantially pan-shaped device when assembled, slots formed in part of the sections, securing bolts extending through the slots secured to the remaining sections whereby the sections may be adjusted relative to each other, a stop pin secured upon one of the sections and engaged by the inner edges of the remaining sections for limiting the inward movement of the sections toward each other, a plurality of legs secured to the outer sides of the sections and adapted to slidably support the sieve upon the ash pan in such a manner that the bottom of the sieve will be below the top of the ash pan when said sieve is mounted thereon, and means secured to the ash sieve for removing the same.

In testimony whereof I have hereunto set my hand in presence of two subscribing witnesses.

DELMER ELBA PRESTON.

Witnesses:
EMMA DETTLER,
ROSALINE KADEWITZ.